United States Patent
Nava et al.

(10) Patent No.: US 9,488,767 B2
(45) Date of Patent: Nov. 8, 2016

(54) LED BASED LIGHTING SYSTEM

(71) Applicant: Cree, Inc., Durham, NC (US)

(72) Inventors: Dante P. Nava, Morrisville, NC (US); Calvin Galberth, Durham, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/451,623

(22) Filed: Aug. 5, 2014

(65) Prior Publication Data

US 2016/0041324 A1    Feb. 11, 2016

(51) Int. Cl.
| | |
|---|---|
| *F21V 8/00* | (2006.01) |
| *F21K 99/00* | (2016.01) |
| *F21V 29/77* | (2015.01) |
| *F21V 3/00* | (2015.01) |

(52) U.S. Cl.
CPC ............ *G02B 6/0001* (2013.01); *F21K 9/135* (2013.01); *F21K 9/52* (2013.01); *F21V 29/773* (2015.01); *F21V 3/00* (2013.01)

(58) Field of Classification Search
USPC ...................................... 362/311.02, 249.02
See application file for complete search history.

(56) References Cited

U.S. PATENT DOCUMENTS

| | | | |
|---|---|---|---|
| 3,581,162 A | 5/1971 | Wheatley | |
| 5,463,280 A | 10/1995 | Johnson | |
| 5,561,346 A | 10/1996 | Byrne | |
| 5,585,783 A | 12/1996 | Hall | |
| 5,655,830 A | 8/1997 | Ruskouski | |
| 5,688,042 A | 11/1997 | Madadi et al. | |
| 5,806,965 A | 9/1998 | Deese | |
| 5,947,588 A | 9/1999 | Huang | |
| 5,949,347 A | 9/1999 | Wu | |
| 6,220,722 B1 | 4/2001 | Begemann | |
| 6,227,679 B1 | 5/2001 | Zhang et al. | |
| 6,234,648 B1 | 5/2001 | Borner et al. | |
| 6,250,774 B1 | 6/2001 | Begemann et al. | |
| 6,276,822 B1 | 8/2001 | Bedrosian et al. | |
| 6,465,961 B1 | 10/2002 | Cao | |
| 6,523,978 B1 | 2/2003 | Huang | |
| 6,550,953 B1 | 4/2003 | Ichikawa et al. | |
| 6,634,770 B2 | 10/2003 | Cao | |
| 6,659,632 B2 | 12/2003 | Chen | |
| 6,709,132 B2 | 3/2004 | Ishibashi | |
| 6,803,607 B1 | 10/2004 | Chan et al. | |

(Continued)

FOREIGN PATENT DOCUMENTS

| | | |
|---|---|---|
| EP | 1058221 A2 | 12/2000 |
| EP | 0890059 B1 | 6/2004 |

(Continued)

OTHER PUBLICATIONS

U.S. Appl. No. 14/284,643, filed May 22, 2014.

(Continued)

*Primary Examiner* — Laura Tso
(74) *Attorney, Agent, or Firm* — Dennis J. Williamson; Moore & Van Allen PLLC

(57) ABSTRACT

An LED lighting system includes an LED assembly for emitting light when energized through an electrical path. An optic element in the enclosure receives the light emitted by the LED assembly and disperses the light from the enclosure. The optic element comprises a light guide for transmitting light from the LED assembly to a light emitting portion where the light emitting portion is configured to visually appear like a filament in a traditional bulb.

12 Claims, 12 Drawing Sheets

(56) References Cited

U.S. PATENT DOCUMENTS

| | | |
|---|---|---|
| 6,848,819 B1 | 2/2005 | Arndt et al. |
| 6,864,513 B2 | 3/2005 | Lin et al. |
| 6,948,829 B2 | 9/2005 | Verdes et al. |
| 6,982,518 B2 | 1/2006 | Chou et al. |
| 7,048,412 B2 | 5/2006 | Martin et al. |
| 7,080,924 B2 | 7/2006 | Tseng et al. |
| 7,086,756 B2 | 8/2006 | Maxik |
| 7,086,767 B2 | 8/2006 | Sidwell et al. |
| 7,144,135 B2 | 12/2006 | Martin et al. |
| 7,165,866 B2 | 1/2007 | Li |
| 7,172,314 B2 * | 2/2007 | Currie et al. ............... 362/240 |
| 7,213,940 B1 | 5/2007 | Van De Ven et al. |
| 7,354,174 B1 | 4/2008 | Yan |
| 7,396,142 B2 | 7/2008 | Laizure, Jr. et al. |
| 7,600,882 B1 | 10/2009 | Morejon et al. |
| 7,726,836 B2 | 6/2010 | Chen |
| 7,824,065 B2 | 11/2010 | Maxik |
| 8,021,025 B2 | 9/2011 | Lee |
| 8,253,316 B2 | 8/2012 | Sun et al. |
| 8,272,762 B2 | 9/2012 | Maxik et al. |
| 8,274,241 B2 | 9/2012 | Guest et al. |
| 8,277,082 B2 | 10/2012 | Dassanayake et al. |
| 8,282,250 B1 | 10/2012 | Dassanayake et al. |
| 8,292,468 B2 | 10/2012 | Narendran et al. |
| 8,322,896 B2 | 12/2012 | Falicoff et al. |
| 8,371,722 B2 | 2/2013 | Carroll |
| 8,400,051 B2 | 3/2013 | Hakata et al. |
| 8,415,865 B2 | 4/2013 | Liang et al. |
| 8,421,320 B2 | 4/2013 | Chuang |
| 8,421,321 B2 | 4/2013 | Chuang |
| 8,421,322 B2 | 4/2013 | Carroll et al. |
| 8,449,154 B2 | 5/2013 | Uemoto et al. |
| 8,502,468 B2 | 8/2013 | Li et al. |
| 8,641,237 B2 | 2/2014 | Chuang |
| 8,653,723 B2 | 2/2014 | Cao et al. |
| 8,696,168 B2 | 4/2014 | Li et al. |
| 8,740,415 B2 | 6/2014 | Wheelock |
| 8,750,671 B1 | 6/2014 | Kelly et al. |
| 8,752,984 B2 * | 6/2014 | Lenk et al. ............... 362/311.02 |
| 8,760,042 B2 | 6/2014 | Sakai et al. |
| 9,097,396 B2 | 8/2015 | Rowlette, Jr. |
| 2004/0201990 A1 | 10/2004 | Meyer |
| 2009/0184618 A1 | 7/2009 | Hakata et al. |
| 2009/0310351 A1 * | 12/2009 | Lin ............... 362/235 |
| 2010/0290235 A1 * | 11/2010 | Wei et al. ............... 362/311.02 |
| 2011/0273102 A1 | 11/2011 | Van De Ven et al. |
| 2012/0040585 A1 | 2/2012 | Huang |
| 2012/0069595 A1 * | 3/2012 | Catalano ............... F21K 9/52 362/555 |
| 2012/0147624 A1 * | 6/2012 | Li et al. ............... 362/609 |
| 2012/0169227 A1 * | 7/2012 | Chidiac ............... 315/35 |
| 2013/0003398 A1 * | 1/2013 | Godbillon ............... F21S 48/2237 362/511 |
| 2013/0026923 A1 | 1/2013 | Athalye et al. |
| 2013/0026925 A1 | 1/2013 | Ven et al. |
| 2013/0069535 A1 | 3/2013 | Athalye |
| 2013/0069547 A1 | 3/2013 | Van De Ven et al. |
| 2013/0119872 A1 | 5/2013 | Chobot |
| 2013/0127353 A1 | 5/2013 | Athalye et al. |
| 2013/0162149 A1 | 6/2013 | Van De Ven et al. |
| 2013/0162153 A1 | 6/2013 | Van De Ven et al. |
| 2013/0169159 A1 | 7/2013 | Lys |
| 2013/0170245 A1 * | 7/2013 | Hong ............... G02B 6/001 362/555 |
| 2013/0194797 A1 * | 8/2013 | Jackson ............... 362/236 |
| 2013/0265796 A1 * | 10/2013 | Kwisthout ............... 362/555 |
| 2013/0293135 A1 | 11/2013 | Hu et al. |
| 2014/0001959 A1 | 1/2014 | Motley et al. |
| 2014/0001963 A1 | 1/2014 | Chobot et al. |
| 2014/0167620 A1 | 6/2014 | Chobot |
| 2014/0167622 A1 | 6/2014 | Chobot et al. |
| 2014/0167623 A1 | 6/2014 | Chobot et al. |
| 2014/0167642 A1 | 6/2014 | Chobot |
| 2014/0167653 A1 | 6/2014 | Chobot |
| 2014/0268790 A1 | 9/2014 | Chobot et al. |
| 2015/0102729 A1 | 4/2015 | Creasman et al. |

FOREIGN PATENT DOCUMENTS

| | | |
|---|---|---|
| GB | 2345954 A | 7/2000 |
| JP | H09265807 A | 10/1997 |
| JP | 2000173304 A | 6/2000 |
| JP | 2001118403 A | 4/2001 |
| WO | 0124583 A1 | 4/2001 |
| WO | 0160119 A2 | 8/2001 |
| WO | 2012011279 A1 | 1/2012 |
| WO | 2012031533 A1 | 3/2012 |

OTHER PUBLICATIONS

U.S. Appl. No. 61/932,058, filed Jan. 27, 2014.
U.S. Appl. No. 14/292,286, filed May 30, 2014.

* cited by examiner

LED BASED LIGHTING SYSTEM

BACKGROUND

Light emitting diode (LED) lighting systems are becoming prevalent as replacements for older lighting systems. LED systems are an example of solid state lighting (SSL) and have advantages over traditional lighting solutions, such as incandescent and fluorescent lighting, because they use less energy, are more durable, operate longer, can be combined in multi-color arrays that can be controlled to deliver virtually any color light, and generally contain no lead or mercury. A solid-state lighting system may take the form of a lighting unit, light fixture, light bulb, or a lamp.

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting the supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

One type of traditional lighting system is an incandescent bulb that typically comprises a wire filament or filaments supported in a glass enclosure. Wires extend between the bulb's Edison screw base and the filament to provide electric current from the bulb's base to the filament. The filament heats and glows to emit usable light. Incandescent bulbs typically have a base with an Edison connector, or other style of connector, that is connected to the enclosure where the enclosure may have a variety of shapes and sizes. Another type of traditional lighting system is a fluorescent bulb that typically comprises a tube containing a gas. An electric current excites the gas to produce short-wave ultraviolet light that causes a phosphor coating on the inside of the bulb to glow. Fluorescent lights typically have a form factor of an elongated tube with a pair of pins at each end of the tube that physically support the lamp in the fixture and deliver current to the lamp.

SUMMARY

In some embodiments a LED lighting system comprises an enclosure and a base connected to the enclosure. A LED assembly emits light when energized through an electrical path from the base. An optic element in the enclosure receives the light emitted by the LED assembly. The optic element comprises a light guide for transmitting light from the LED assembly to a light emitting portion where the light emitting portion is configured to visually appear like a filament in a traditional bulb.

The base may comprise an Edison base. The light emitting portion may comprise surface treatment on the optic element. The surface treatment may comprise surface indentations formed on the optic element. The light emitting portion may be configured to visually appear like one of a cage, a coil, a loop, and an inverted U filament. The optic element may be transparent. The light emitting potion may comprise a light diffusive surface. A switch may alter current delivered to the LED assembly where the color of the light changes in response to the current. A switch may lower current delivered to the LED assembly where the color of the light changes to red/orange/red-orange in response to the lowering of the current.

In some embodiments a LED lighting system comprises a base and a LED assembly for emitting light when energized through an electrical path from the base. An optic element is connected to the base for receiving the light emitted by the LED assembly. The optic element comprises an exterior surface and an internal passage defining an internal light guide for transmitting light from the LED assembly to a light emitting portion where the internal light guide is configured like a filament in a traditional bulb. The exterior surface of the optic element is exposed.

The exterior surface of the optic element may form the light exit surface of the lamp. The exterior surface of the optic element may be configured like a traditional bulb. The light emitting portion may comprise a surface treatment formed in the internal passage.

In some embodiments a LED lighting system comprises a LED assembly for emitting light when energized through an electrical path. An optic element is formed as an elongated solid member of optically transmissive material. The optic element receives the light emitted by the LED assembly. The optic element comprises a light emitting portion for emitting the light from the optic element.

The light emitting portion may comprise surface treatment on the optic element. The surface treatment may comprise surface indentations formed on the optic element. The LED assembly may be located at a first end of the elongated member. A second LED assembly may be located at a second end of the elongated member opposite to the first end. The electrical path may comprise a first pair of pins positioned at the first end of the elongated member and a second pair of pins positioned at the second end of the elongated member.

DETAILED DESCRIPTION

Figure 1:
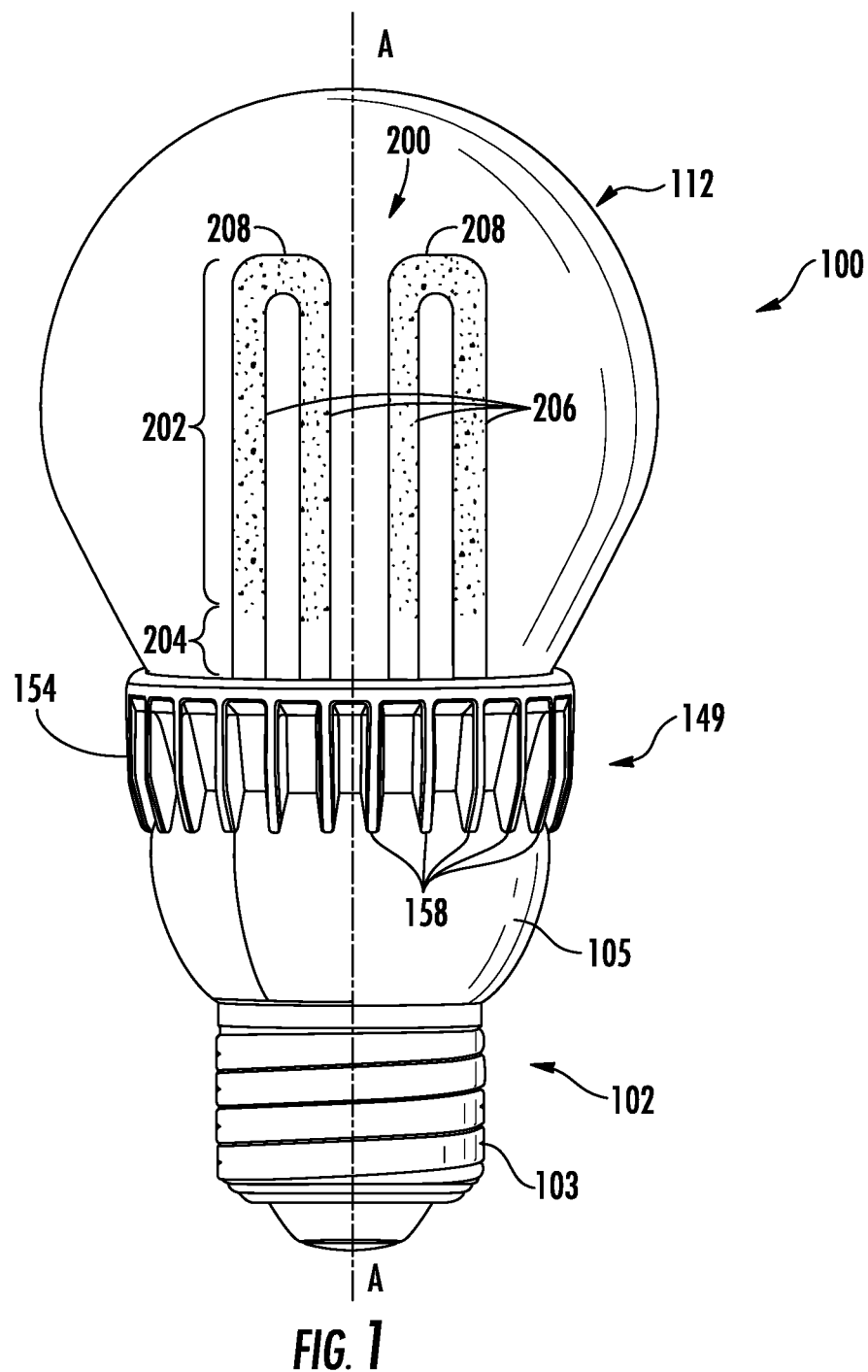
FIG. 1 is a side view of an embodiment of a LED lamp of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

It should also be noted that the term "lighting system" is meant to encompass not only a solid-state replacement for a traditional incandescent bulb, a fluorescent bulb, a complete fixture, as illustrated herein, but also a replacement for any type of light fixture that may be designed as a solid state fixture.

In a traditional incandescent bulb a filament, such as a tungsten filament, may be supported by support wires secured to or embedded in a glass stem where the stem extends from the bulb base into an optically transmissive enclosure such as a glass globe. In a typical modern bulb, the support wires position the filament at the approximate center of the enclosure such that the filament extends generally transversely to the longitudinal axis of the bulb. The light is projected substantially uniformly over the surface of the enclosure, although some variation in the dispersion of light over the surface area of the enclosure may occur. In other Edison style incandescent bulbs the filament may assume a variety of shapes within the enclosure. In vintage incandescent bulbs and in some modern incandescent bulbs designed to mimic vintage bulbs, the filament may assume more complex shapes within the enclosure. For example multiple glowing filaments may be provided that extend in a variety of patterns. Such filaments may assume a variety of shapes such as multiple loops, cage style, spiral, hairpin or the like. In traditional incandescent bulbs current is delivered to the filament or filaments by electrical wires that extend from the electrically conductive base and are connected to the filament(s). The electrical wires may also serve as the physical support for the filament(s). Electrical current is passed through the filament(s) causing the filament to heat and produce visible light. The filament(s) may be visible during operation of the bulb as a glowing component, especially when the bulb is dimmed. When low current is passed through the filament, such as in a dimmer application, the filament may glow as yellow-orange-red light.

The LED lighting system of the invention uses an LED light source in a lamp that has the visual appearance of a traditional incandescent bulb. In some embodiments, a lamp having a connector such as an Edison screw may be connected to a source of power, such as an Edison socket. The Edison screw may both provide the physical connection between the lamp and the fixture and form part of the electrical path for providing current from a power source to the LEDs. In other embodiments the lamp may comprise an LED light source connected to a bayonet-style base that may be inserted into a bayonet-style socket. In a bayonet-style connector the lamp base comprises external lugs where the base and socket are configured to correspond to, and to have the external appearance of, standard bayonet connectors. Typically, in a standard bayonet connector the base is inserted into the socket and is rotated a partial turn to engage the lugs with lug receptacles in the socket. Standard bayonet connectors come in a variety of sizes. The bayonet connector may both provide the physical connection between the lamp and the fixture and form part of the electrical path for providing current from a power source to the LEDs. The lamp comprises an internal optic element that is configured such that he optic element emits light in a visible pattern that has a visual appearance that mimics the light pattern emitted by a glowing incandescent filament of a traditional incandescent bulb. The Edison screw may be provided in a variety of sizes and thread pitches.

Edison-style and bayonet-style connectors may be referred to herein collectively as "traditional-style" connectors where traditional-style connectors means connectors, e.g. a lamp base and a corresponding socket, having a physical form factor that is similar in appearance to the connector used on a traditional bulb (e.g. Edison screw, bayonet connector or the like). In the lamp of the invention the traditional-style connector may provide the physical connection for the lamp and may form part of the electrical path to the LEDs. In other embodiments bases other than traditional-style bases may be used.

Figure 2:
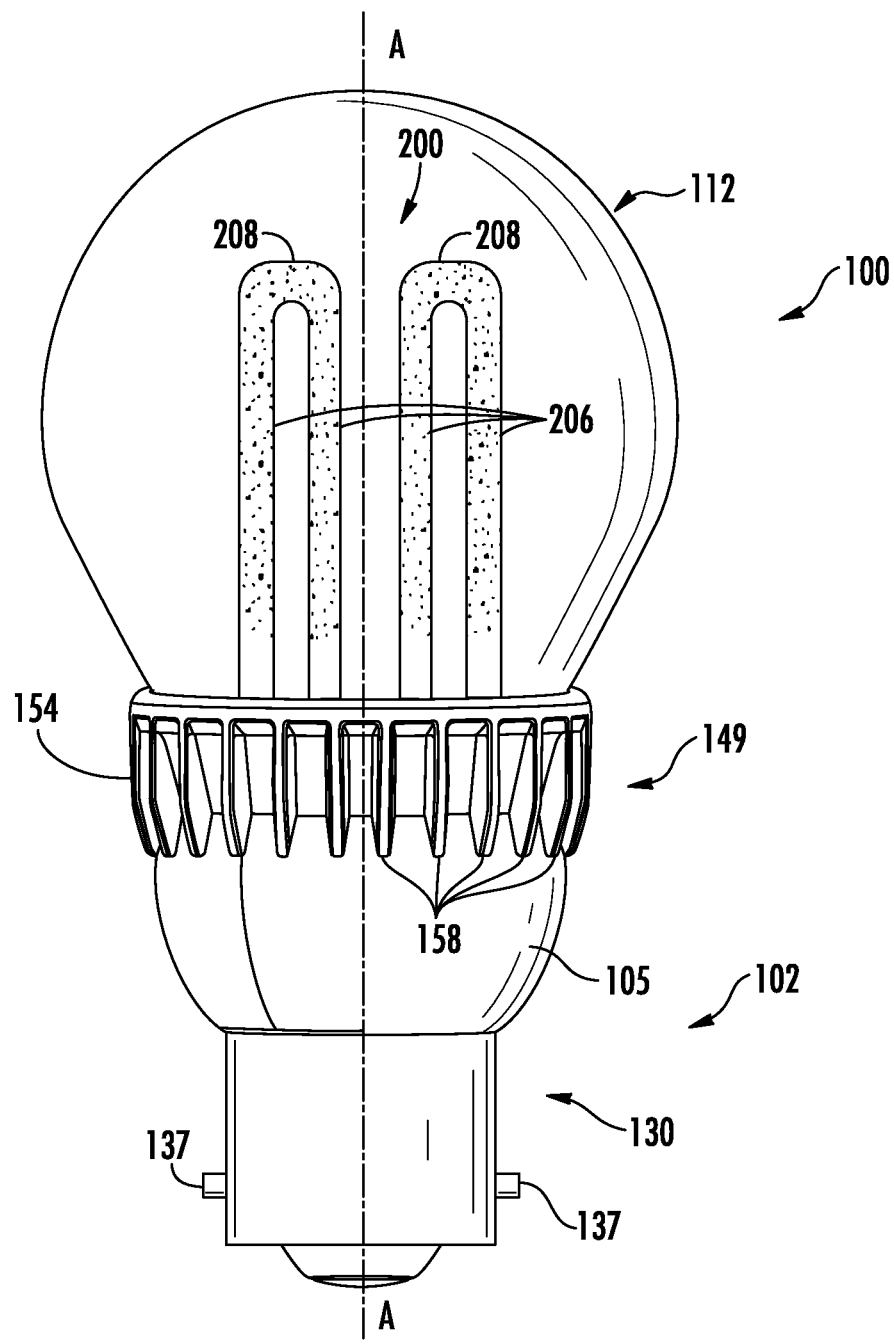
FIG. 2 is a side view of an alternate embodiment of a LED lamp of the invention.

FIGS. 1 and 2 show a lamp 100 according to some embodiments of the present invention. Lamp 100 is shown having a form factor that may correspond to an incandescent bulb, such as an A-series bulb, or similar style bulb with a base 102 and an optically transmissive enclosure 112. Lamp 100 may be designed to serve as a solid-state replacement for an incandescent bulb. Lamp 100 may have other form factors and may also have the size and form factor of a smaller incandescent bulb, such as that commonly used in appliances, ceiling fans, chandeliers or the like or of larger bulbs such as bulbs that use mogul connectors. The lamp 100 may conform to other standards or to other non-standard bulb form factors. Because the lamp 100 of the invention may be advantageously used to mimic the visual appearance of an illuminated traditional or vintage bulbs (hereinafter "traditional bulbs") the enclosure 112 may have a shape that conforms to traditional bulbs including globe, tube, or the like. The enclosure 112 is, in some embodiments, a transparent enclosure of similar shape to that commonly used in traditional incandescent bulbs. The enclosure may be formed of glass, polycarbonate or other optically trasnmissive material. In some embodiments, the enclosure 112 may be coated on the inside with silica, providing a diffuse scattering layer that produces a more uniform far field pattern. It should also be noted that in this or any of the embodiments shown here, the optically transmissive enclosure 112 or a portion of the optically transmissive enclosure could be coated or impregnated with phosphor or a diffuser. Because the lamp as described herein may be used to mimic the appearance of traditional incandescent bulbs, including vintage bulbs, the enclosure 112 may have a form factor that corresponds to the size and shape of a traditional bulb and the enclosure 112 may be transparent such that the glowing optical element 200 is visible through the enclosure 112. The enclosure 112 may also be made of a transparent colored material.

Figure 3:
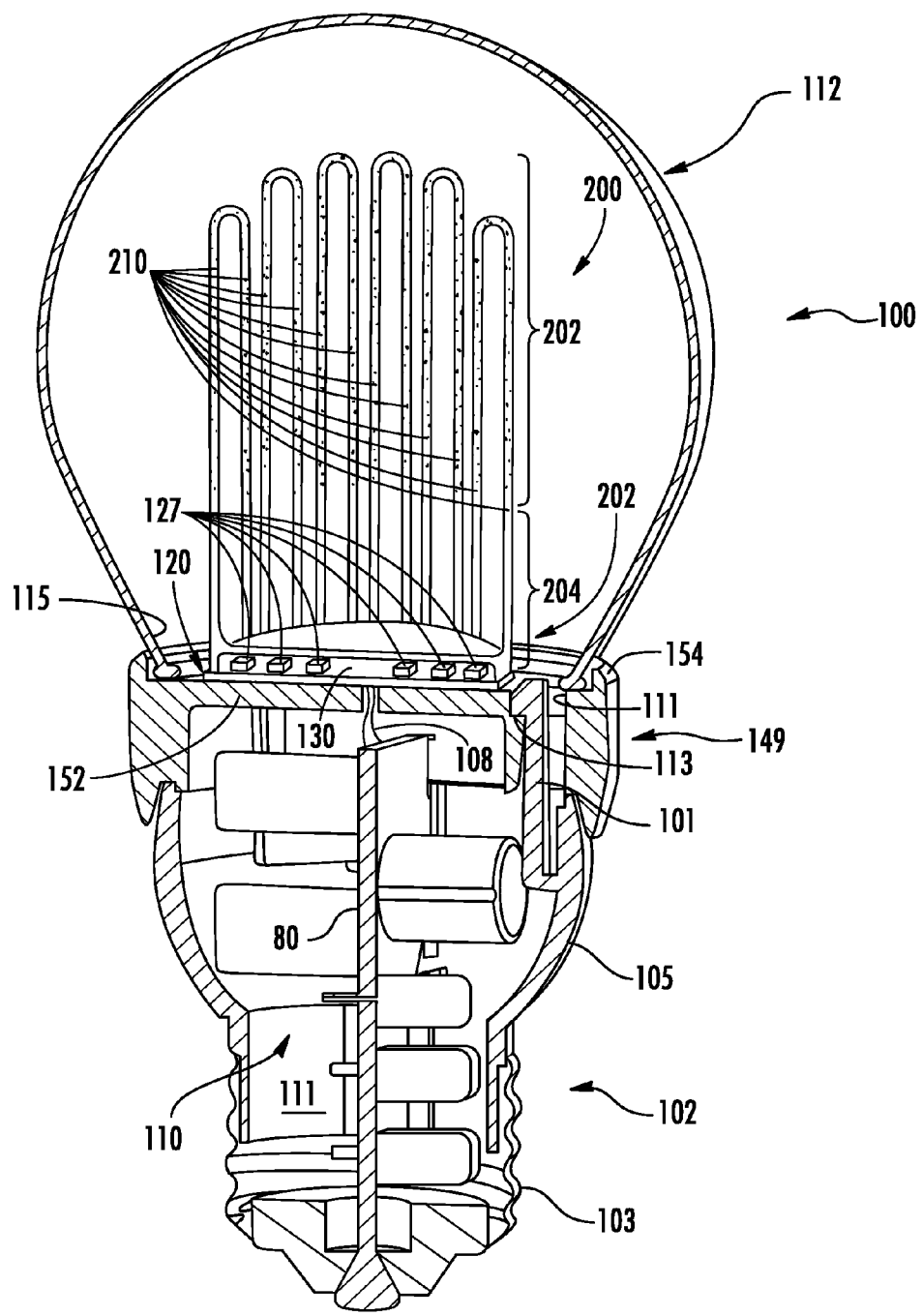
FIG. 3 is a section view of another embodiment of a LED lamp of the invention.

Referring to FIG. 3, an example of an embodiment of a LED lamp is shown comprising a LED assembly 120 provided with light emitting LEDs and/or LED packages 127. Multiple LEDs 127 may be used together, forming an LED array. The LEDs 127 can be mounted on or fixed within the lamp in various ways. In at least some example embodiments, a LED board 130 may be used to support the LEDs 127 and to form part of the electrical path to the LEDs. The LED board 130 may comprise a PCB, MCPCB, flex circuit, lead frame structure, flexible PCB or other similar structure. The LEDs 127 may comprise one or more LED dies disposed in an encapsulant such as silicone, and LEDs which may be encapsulated with a phosphor to provide local wavelength conversion. A wide variety of LEDs and combinations of LEDs may be used.

With respect to the features of the LED assembly and related electronic described herein with various example embodiments of a lamp, the features can be combined in various ways. For example, the various methods of including phosphor in the lamp can be combined and any of those methods can be combined with the use of various types of LED arrangements such as bare die versus encapsulated or packaged LED devices. The embodiments shown and described herein are examples only and are intended to be illustrative of various design options for a LED lighting system.

LEDs and/or LED packages used with an embodiment of the invention and can include light emitting diode chips that emit different hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light. LEDs 127 may be individually encapsulated, each in a package with its own lens. Such embodiments can produce light with a CRI of at least 70, at least 80, at least 90, or at least 95.

A lighting system using the combination of BSY and red LED devices referred to above to make substantially white light can be referred to as a BSY plus red or "BSY+R" system. In such a system, the LED devices used include LEDs operable to emit light of two or more different colors. A further detailed example of using groups of LEDs emitting light of different wavelengths to produce substantially while light can be found in issued U.S. Pat. No. 7,213,940, which is incorporated herein by reference.

With the embodiment of FIGS. 1 and 2, as with many other embodiments of the invention, the term "electrical path" can be used to refer to the entire electrical path to the LEDs 127, including an intervening power supply disposed between the electrical connection that would otherwise provide power directly to the LEDs and the LEDs, or it may be used to refer to the connection between the mains and all the electronics in the lamp, including the power supply. The term may also be used to refer to the connection between the power supply and the LEDs.

A base 102 may be connected to the enclosure 112 where the base functions as the physical connector to connect the lamp 100 to a corresponding socket. The base 102 may comprise an Edison base with an Edison screw 103, shown in FIG. 1, that comprises threads that engage a standard Edison socket such that the base 102 may be screwed into the socket in the same manner as a standard Edison screw. Depending on the embodiment, other base configurations are possible to make the electrical connection such as other traditional-style bases. For example, referring to FIG. 2, a bayonet-style connector is shown where base 102 may comprise a bayonet connector 130 that may be connected to a bayonet-style socket. The bayonet connector 130 is inserted into the socket such that lugs 137 engage slots in the socket. The base is then rotated a partial turn to lock the lugs 137 in the slots. The bayonet or Edison connector provides the physical connection between the lamp 100 and the fixture and may form part of the electrical path to the LEDs 127.

The base 102 may comprise a screw connector 103 or a bayonet connector 130 that may be connected to a housing 105 by adhesive, mechanical connector, welding, separate fasteners or the like. The housing 105 may be made of an electrically insulating material such as plastic. In some embodiments the housing 105 may comprise a thermally conductive material where heat may be dissipated from the lamp in part using the housing 105.

The housing 105 and the Edison screw 103 (or bayonet connector 130) define an internal cavity 111 for receiving the electronics 110 of the lamp including the power supply and/or drivers or a portion of the electronics for the lamp. The lamp electronics 110 are electrically coupled to the Edison screw 103 such that the electrical connection may be made from the Edison screw 103 to the lamp electronics 110. The lamp electronics may be mounted on a printed circuit board 80 which includes the power supply, including large capacitor and EMI components that are across the input AC line along with the driver circuitry as described herein. The base may be potted to protect and isolate the lamp electronics 110. Electrical conductors 108 run between the lamp electronics 110 and the LEDs 127 to carry both sides of the supply to provide critical current to the LEDs 127.

In some embodiments, a driver and/or power supply 110 are included in the base 102 as shown. Base 102 may include the power supply or driver and form all or a portion of the electrical path between the mains and the LEDs 127. The base 102 may also include only part of the power supply circuitry while some smaller components reside with the LED assembly 120. In one example embodiment, the inductors and capacitor that form part of the EMI filter are in the base. Suitable power supplies and drivers are described in U.S. patent application Ser. No. 13/462,388 filed on May 2, 2012 and titled "Driver Circuits for Dimmable Solid State Lighting Apparatus" which is incorporated herein by reference in its entirety; U.S. patent application Ser. No. 12/775,842 filed on May 7, 2010 and titled "AC Driven Solid State Lighting Apparatus with LED String Including Switched Segments" which is incorporated herein by reference in its entirety; U.S. patent application Ser. No. 13/192,755 filed Jul. 28, 2011 titled "Solid State Lighting Apparatus and Methods of Using Integrated Driver Circuitry" which is incorporated herein by reference in its entirety; U.S. patent application Ser. No. 13/339,974 filed Dec. 29, 2011 titled "Solid-State Lighting Apparatus and Methods Using Parallel-Connected Segment Bypass Circuits" which is incorporated herein by reference in its entirety; U.S. patent application Ser. No. 13/235,103 filed Sep. 16, 2011 titled "Solid-State Lighting Apparatus and Methods Using Energy Storage" which is incorporated herein by reference in its entirety; U.S. patent application Ser. No. 13/360,145 filed Jan. 27, 2012 titled "Solid State Lighting Apparatus and Methods of Forming" which is incorporated herein by reference in its entirety; U.S. patent application Ser. No. 13/338,095 filed Dec. 27, 2011 titled "Solid-State Lighting Apparatus Including an Energy Storage Module for Applying Power to a Light Source Element During Low Power Intervals and Methods of Operating the Same" which is incorporated herein by reference in its entirety; U.S. patent application Ser. No. 13/338,076 filed Dec. 27, 2011 titled "Solid-State Lighting Apparatus Including Current Diversion Controlled by Lighting Device Bias States and Current Limiting Using a Passive Electrical Component" which is incorporated herein by reference in its entirety; and U.S. patent application Ser. No. 13/405,891 filed Feb. 27, 2012 titled "Solid-State Lighting Apparatus and Methods Using Energy Storage" which is incorporated herein by reference in its entirety.

The AC to DC conversion may be provided by a boost topology to minimize losses and therefore maximize conversion efficiency. The boost supply is connected to high voltage LEDs operating at greater than 200V. Examples of boost topologies are described in U.S. patent application Ser. No. 13/462,388, entitled "Driver Circuits for Dimmable Solid State Lighting Apparatus", filed on May 2, 2012 which is incorporated by reference herein in its entirety; and U.S. patent application Ser. No. 13/662,618, entitled "Driving Circuits for Solid-State Lighting Apparatus with High Voltage LED Components and Related Methods", filed on Oct. 29, 2012 which is incorporated by reference herein in its entirety. Other embodiments are possible using different driver configurations or a boost supply at lower voltages.

In some embodiments the driver circuit may have an input configured to be coupled to a power source, such as a phase cut dimmer, that provides a varying voltage waveform. The driver may include electromagnetic interference suppression electronics to reduce noise in the driver. One such suitable electronics is shown and described in U.S. patent application Ser. No. 14/284,643, entitled "Lighting apparatus with Inductor Current Limiting for Noise reduction", filed on May 22, 2014, which is incorporated by reference herein in its entirety.

Referring again to the figures, the LED assembly 120 may be thermally coupled to a heat sink. In some embodiments the LED board 130 is mounted on or to the heat sink 149. The heat sink 149 comprises a heat conducting portion 152 and a heat dissipating portion 154 as shown for example in FIGS. 3-5. In one embodiment the heat sink 149 is made as a one-piece member of a thermally conductive material such as aluminum, zinc or the like. The heat sink 149 may also be made of multiple components secured together. Moreover, the heat sink 149 may be made of any thermally conductive material or combinations of thermally conductive materials. In some embodiments a heat sink structure may not be used.

The heat conducting portion 152 is dimensioned and configured to make good thermal contact with the LED assembly 120 such that heat generated by the LED assembly 120 may be efficiently transferred to the heat sink 149. The heat dissipating portion 154 is in good thermal contact with the heat conducting portion 152 such that heat conducted away from the LED assembly 120 by the heat conducting portion 152 may be efficiently dissipated from the lamp 100 by the heat dissipating portion 154. The heat dissipating portion 154 extends from the interior of the lamp the exterior of the lamp 100 such that heat may be dissipated from the lamp to the ambient environment. A plurality of heat dissipating members 158 (FIGS. 1 and 2) may be formed on the exposed portion to facilitate the heat transfer to the ambient environment. In one embodiment, the heat dissipating members 158 comprise a plurality fins that extend outwardly to increase the surface area of the heat dissipating portion 154. The heat dissipating portion 154 and fins 158 may have any suitable shape and configuration. The base may comprise flexible members or fingers 101 that are inserted into apertures 111 in the heat sink 149 and engage mating engagement surfaces 113.

The lamp 100 comprises an optic element 200 that extends from adjacent the base 102 and that is configured and positioned in the enclosure 112 such that it is in approximately the same position as the glowing filament of a traditional incandescent bulb. The optic element 200 functions as a light guide to transmit light from the LEDs 127 to a light emitting portion and to emit the light from the optic element 200. The optic element 200 may be configured and located in the area defined by the glowing filament in a traditional incandescent bulb such that the light emitting portion of the optical element is configured in the lamp to have a visual appearance that is similar to or mimics the glowing filament of an incandescent bulb. The optic element 200 may be made of acrylic or other moldable optically transmitting plastic, other plastic material, glass or other light transmitting material. In one embodiment the optic element 200 is transparent. In one embodiment the optic element 200 may be a solid piece of material formed or shaped as an elongated member having a circular, rectangular, triangular or other cross-section shape. Alternatively the optic element 200 may be formed as a hollow elongated member with an interior cavity that extends for the length of the elongated member. A single member may be used to make the optic element 200 or the optic element 200 may be made of a plurality of separate members. Light generated by the LEDs 127 is directed into the optic element 200 such that light may be transmitted through the optic element 200 to a light emitting portion that emits light from the optic element such that it is visible from the exterior of the lamp through the enclosure 112. The LEDs 127 may transmit light directly into the optic element 200 or a lens or other optical device may be provided that transmits light from the LEDs 127 to the optic element 200. In some embodiments a mixing chamber may be used to mix the light from the LEDs 127 before the light enters the optic element 200.

The optic element 200 is configured such that the light received from the LEDs 127 is emitted in a pattern that visually appears similar to or that mimics the light as it appears from the glowing filament of a traditional incandescent bulb. Light is transmitted along the length of the optic element 200. The optic element 200 may use total internal reflection to transmit the light along the length of the optic element. The optic element 200 comprises a light emitting portion 202 that defines the "filament portion" of the optic element 200 that emits and diffuses the light from the optic element 200. The light emitting portion 202 may comprise a notched, roughened or irregular surface, or other surface treatment (represented by the dotted area in the Figures) that causes the light to be emitted from the optic element 200 in random directions such that the light undergoes diffusion or scattering. The surface treatment of the light emitting portion 202 may be provided by scratching, etching or otherwise treating the optical element 200. Alternatively the surface treatment of the light emitting portion 202 may be provided during formation of the optic element 120 such as during a molding process of the optic element. The term "surface treatment" is used to mean a configuration of the light emitting portion of the optic element 200 that allows light to be refracted and transmitted across a boundary such that the light is transmitted from the optic element and typically includes light scattering or diffusing properties. The "surface treatment" may comprise "surface indentations" where the "surface indentation" means a treatment of the optic element that creates surface irregularities that cause light to be emitted from the optic element such as etching, roughening, molding of irregularities or the like.

The optic element 200 may also include non-light emitting portions 204 in those areas where no light is to be emitted from the optic element. The non-light emitting portions 204 may serve as light paths between the LEDs 127 and the light emitting portions 202 of the optic element 200 such that the light is only visible in areas that correspond to the illuminated filament in a traditional incandescent bulb. For example the non-light emitting portions 204 of the optic element 200 may not comprise the surface treatments described above.

Figure 6:
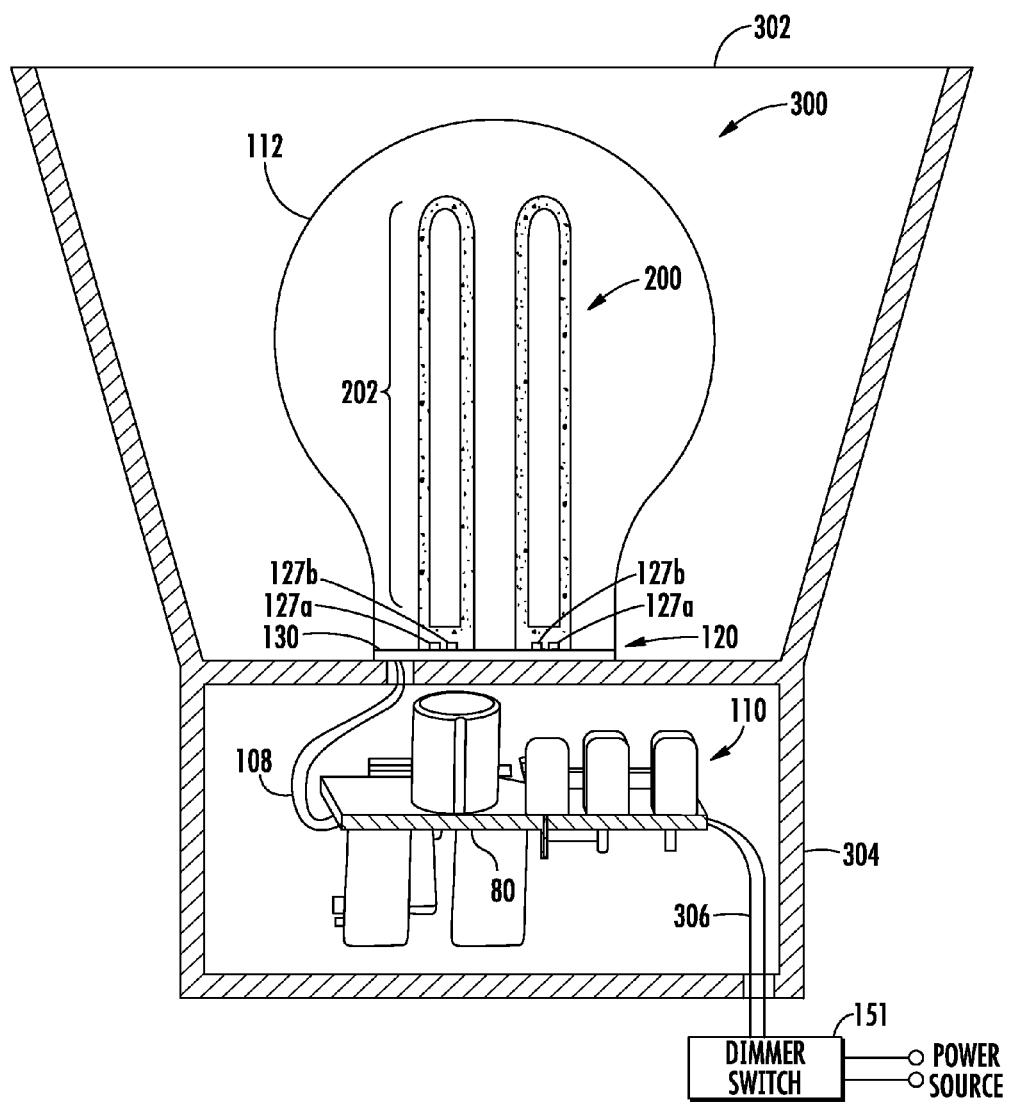
FIG. 6 is a section view of an embodiment of a LED lighting system of the invention.

In one embodiment, the LEDs 127 may be controlled to control the color of the light emitted from the optic element 200. In one embodiment, the light is controlled such the light emitted from the optic element 200 may be, under certain operating conditions, red/orange/red-orange in color. Software may be used to shunt current to and from selected LEDs 127 to control the color of the light emitted by the LED assembly 120. In one embodiment, the color of the light may be changed from essentially white light to red/orange/red-orange light when a user lowers the current delivered to the LED power supply 110. As shown in FIG. 6, in one embodiment a dimmer switch 151 may be provided to control the current delivered to the LED power supply. The dimmer switch 151 may be provided in the electrical path and may be part of the fixture with which the lamp 100 is used or it may be located remotely from the fixture such as on a wall as is typical of a standard light switch. When the current delivered to the LED power supply 110 falls below a predetermined value, the power supply software shunts the current to desired LEDs 127a, 127b to change the color of the light emitted from the LED assembly 120. By making the color change to red/orange/red-orange when the current is lowered (such as in response to a user controlled dimmer switch) the optic element 200 can be made to glow red-orange in the area of the light emitting area 202 to simulate the look of a dimmed incandescent bulb. In some embodiments, the color may change as the current passes predetermined levels. For example, at a first current level the color may change to red-orange and at a second current level the color may change to orange and at a third current level the color may change to white. As the current level rises the lumens output by the LEDs 127 may also increase such that the brightness of the lamp increases as the color changes. The dimmable, color changing arrangement described with respect to FIG. 6 may be used with any of the embodiments described herein.

Figure 4:
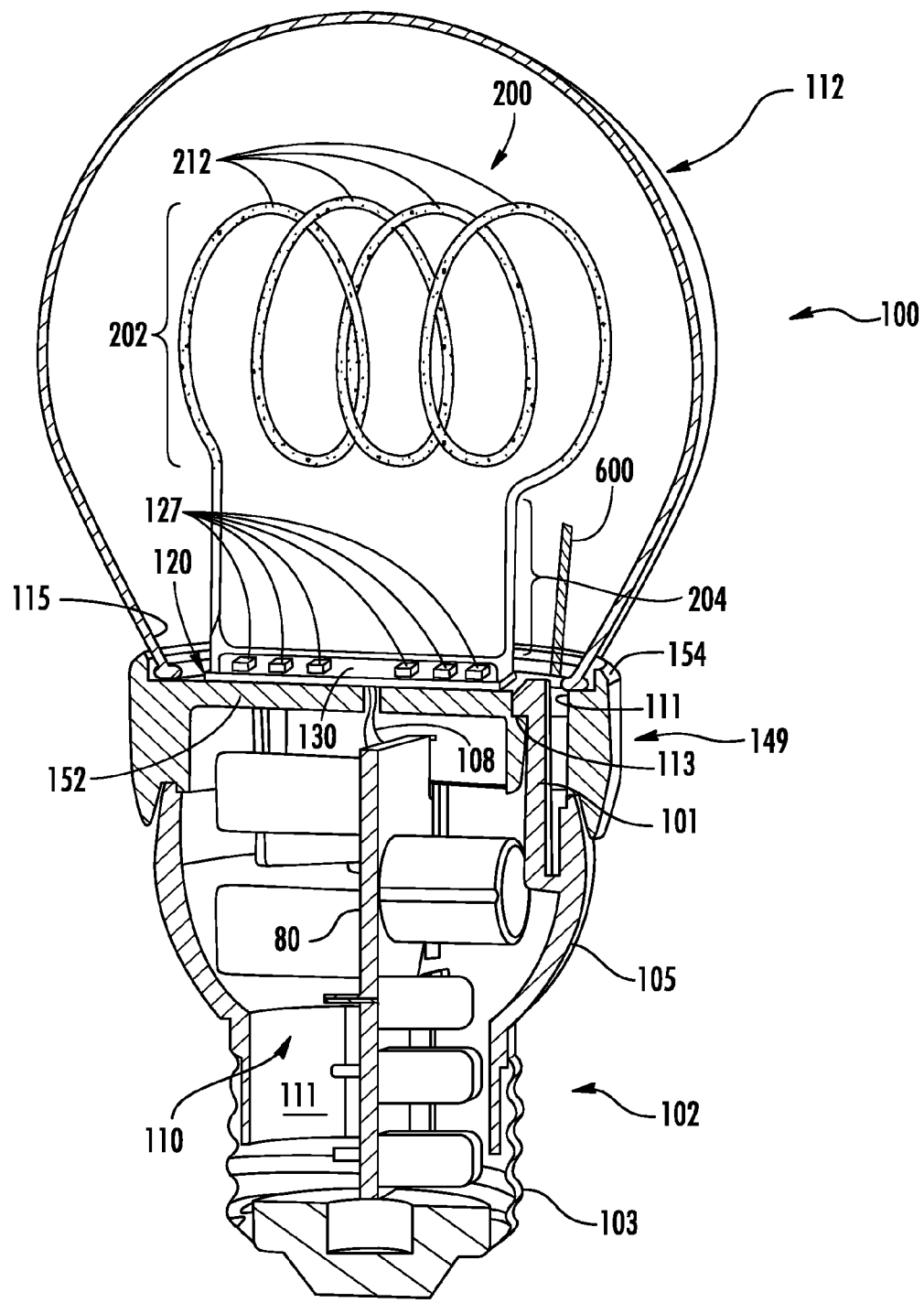
FIG. 4 is a section view of another embodiment of a LED lamp of the invention.
Figure 5:
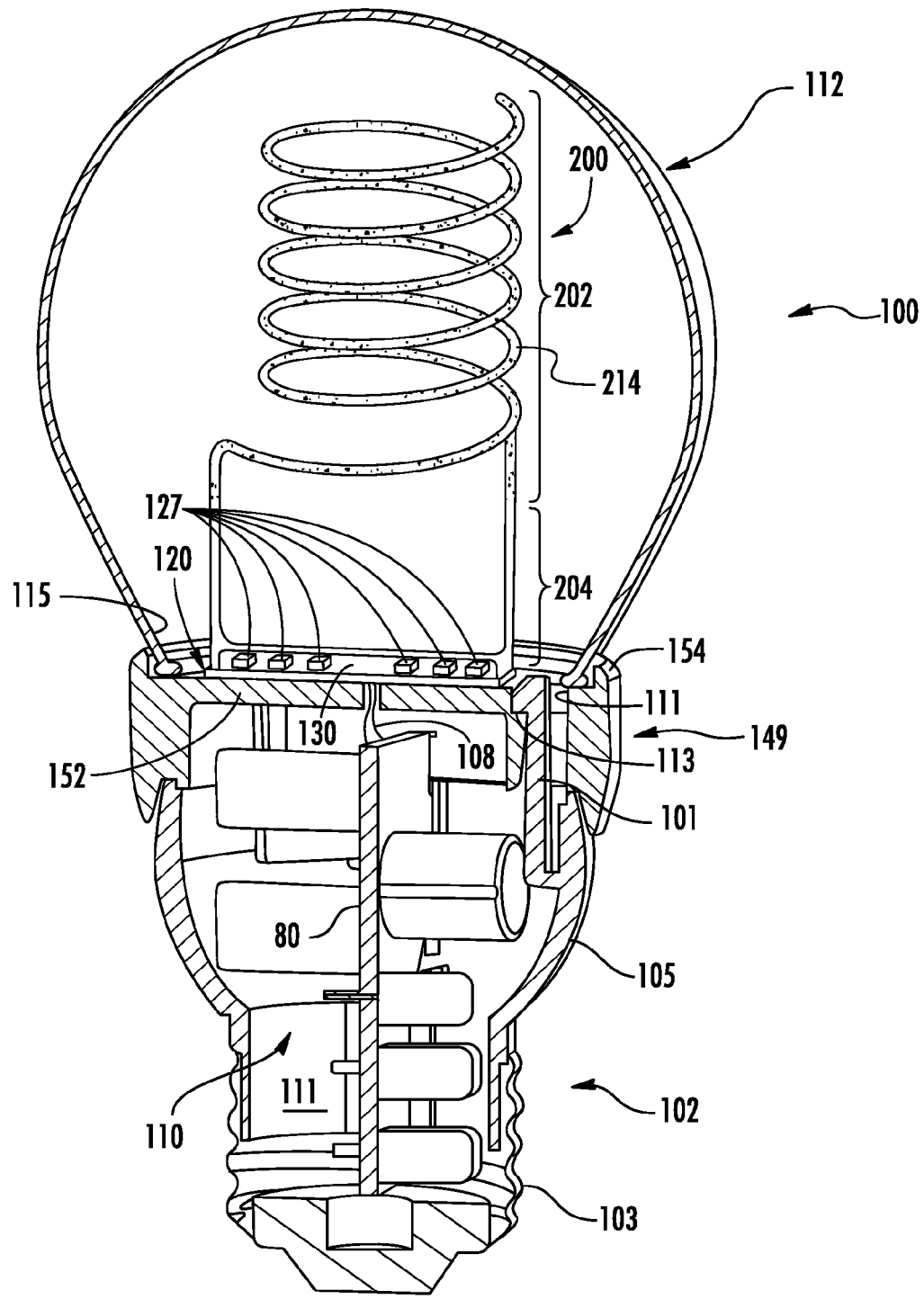
FIG. 5 is a section view of another embodiment of a LED lamp of the invention.
Figure 7:
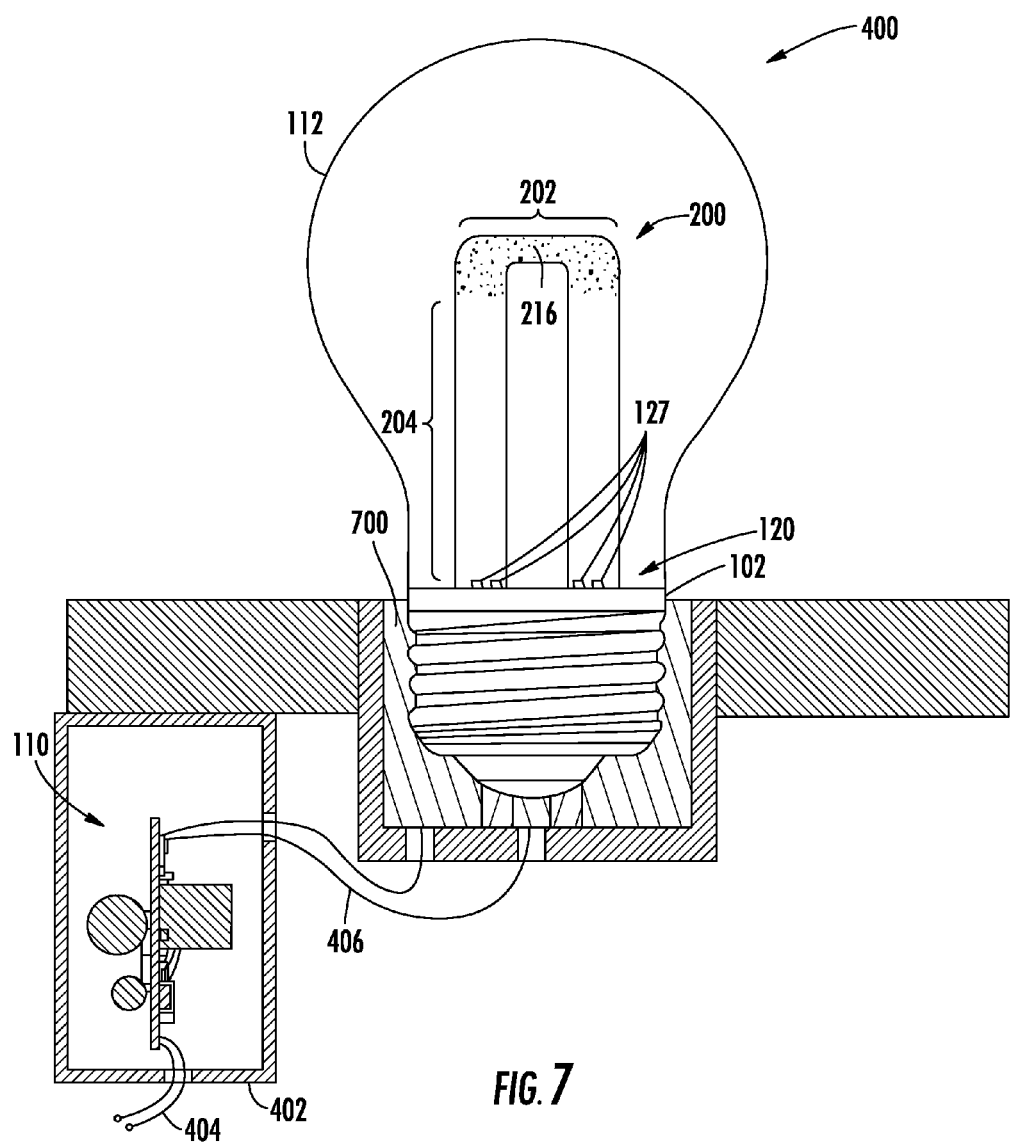
FIG. 7 is a partial section view of an embodiment of a LED lighting system of the invention.
Figure 13:
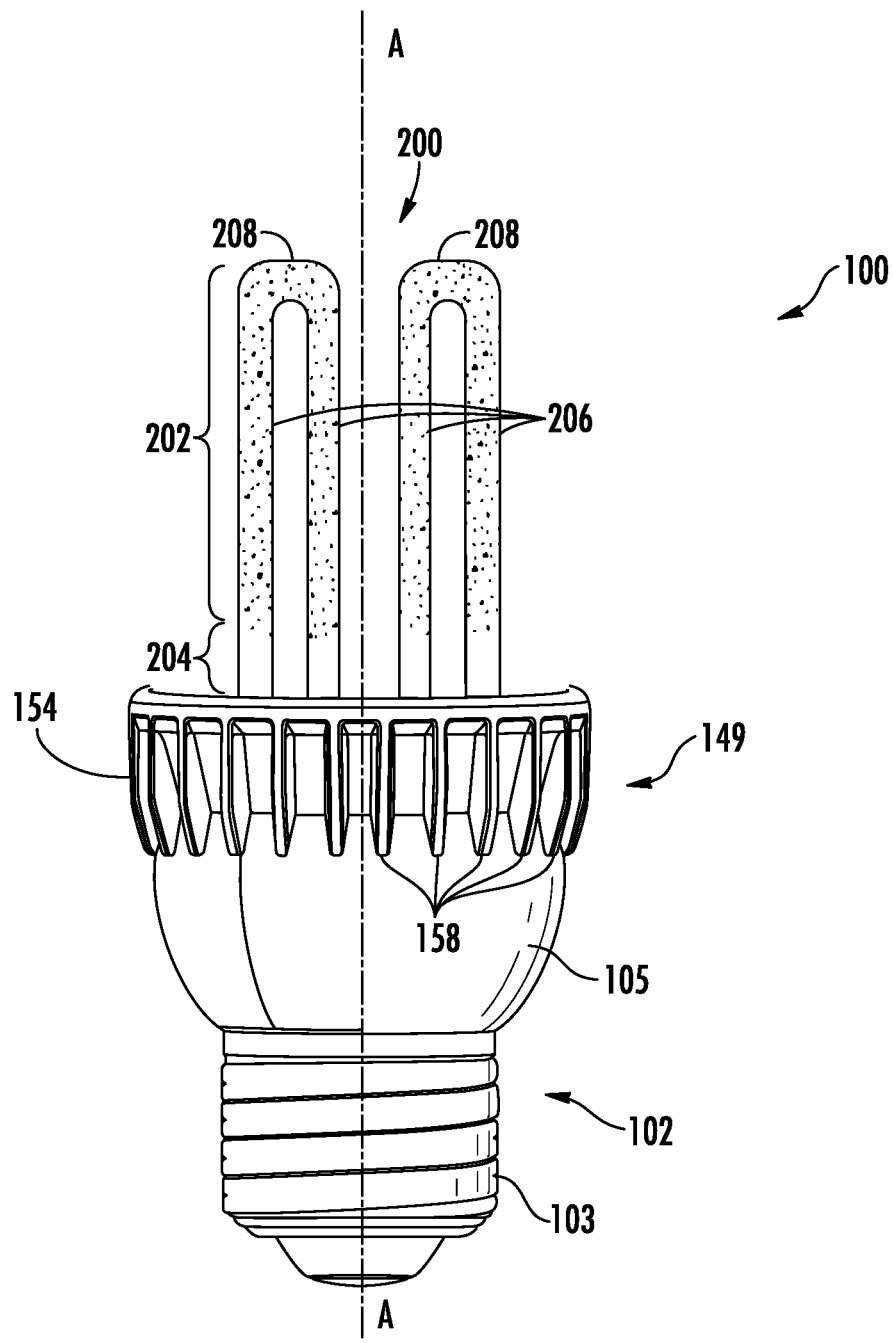
FIG. 13 is a side view of an alternate embodiment of a LED lamp of the invention.

In the embodiment of FIGS. 1 and 2 the optic element 200 is formed to have plural linear portions 206 that are disposed in the enclosure 112 to simulate the look of filaments as found in traditional incandescent bulbs. The portions 206 may be inserted through opening 115 in enclosure 112 and may extend parallel to the longitudinal axis of the lamp and may be connected by horizontal portions 208 to form elongated inverted U-shaped light emitting portions 202. FIG. 3 shows the optic element 200 formed to simulate a cage style filament as found in traditional incandescent bulbs. Optic element 200 comprises a plurality of relatively narrow linear elements 210 extending along the longitudinal axis of the lamp and arranged to create a cylinder or other cage arrangement. FIG. 4 shows the optic element 200 formed to simulate a multiple coil style filament where the optic element is formed into a series of loops 212 disposed at the approximate center of the enclosure as found in traditional incandescent bulbs. FIG. 5 shows the optic element 200 formed to simulate a spiral style filament where the optic element is formed into a spiral 214 centered on the longitudinal axis of the lamp as found in traditional incandescent bulbs. The optic element may be formed into other traditional shapes, such as "hairpin", or non-traditional shapes. FIG. 7, for example, shows the light emitting portion 202 as a horizontal cylinder located in the same position as a filament in a standard A-series bulb. Referring to FIG. 13, in some embodiments the enclosure 112 may be eliminated and the optic element 200 may be exposed.

Another embodiment of the invention is shown in FIG. 6. In this embodiment a light source 300 comprising the enclosure 112, the LED assembly 120 and the optic element 200 are formed as part of a housing or fixture 302 where the enclosure 112, the LED assembly 120 and the optic element 200 are not intended to be removed from the fixture 302. The lamp electronics 110 such as the power supply and drivers may be located in a separate base 304 of the fixture 302 removed from the light source 300. Connectors such as wires 306 may connect the lamp electronics 110 to a source of power such as the power grid of a building. The lamp electronics 110 are also connected to the LED assembly 120 by connectors 108 such as wires to complete the electrical path to the LEDs 127. The fixture may have any suitable shape and size and more than one light source may be provided in a single fixture. The optic element 200 in the light source may be configured as previously described herein.

Another embodiment of the invention is shown in FIG. 7. In this embodiment the base 102 of the lamp 400 may be removably connected to a socket 700. The socket 700 and base 102 may comprise mating Edison-style connectors (as shown) or bayonet style connector or other type of connector. The base 102 functions as the physical connector to connect the lamp 100 to the Edison-style socket 700 and forms part of the electrical path for delivering current to the LEDs 127. The electronics 110 for the LED assembly 120 such as the power supply and drivers may be located with the socket in the fixture such that the socket delivers suitable current and voltage for powering the LEDs 127 in the lamp. In such an embodiment the lamp may comprise an electrical path from the base to the LED assembly 120 without any intervening electronics. In some embodiments the lamp electronics 110 comprising, for example, the power supply and/or drivers may be located outside of the socket 700 but in the electrical path to the LED assembly 120 such as in a junction box 402 associated with the socket. Connectors such as wires 404 may connect the power supply to a source of power such as the power grid of a building. The power supply is also connected to the socket 700 by connectors 406 such as wires to complete the electrical path to the LEDs. The fixture may have any suitable shape and size and more than one light source may be provided in the fixture.

Figure 8:
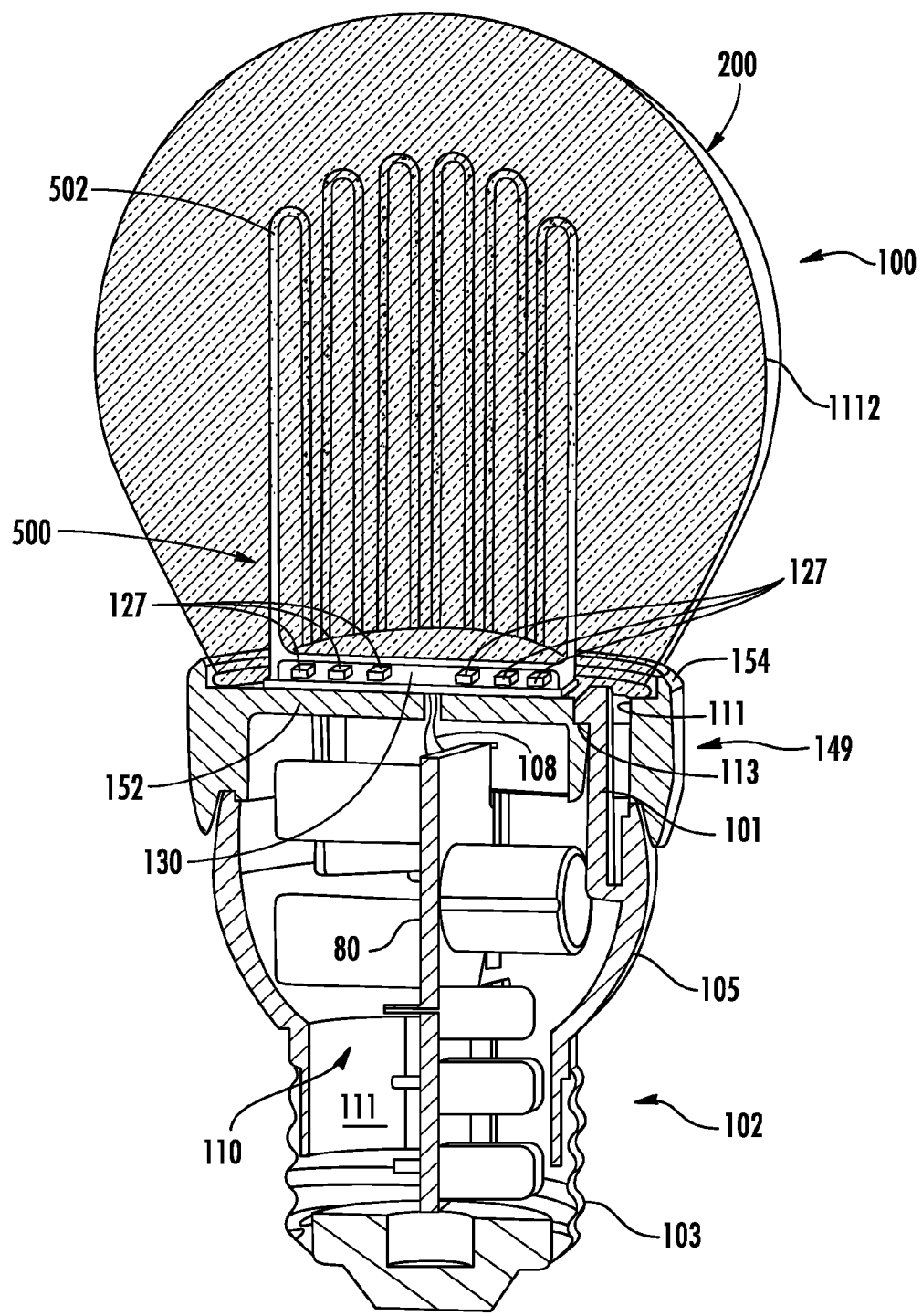
FIG. 8 is a section view of another embodiment of a LED lamp of the invention.
Figure 9:
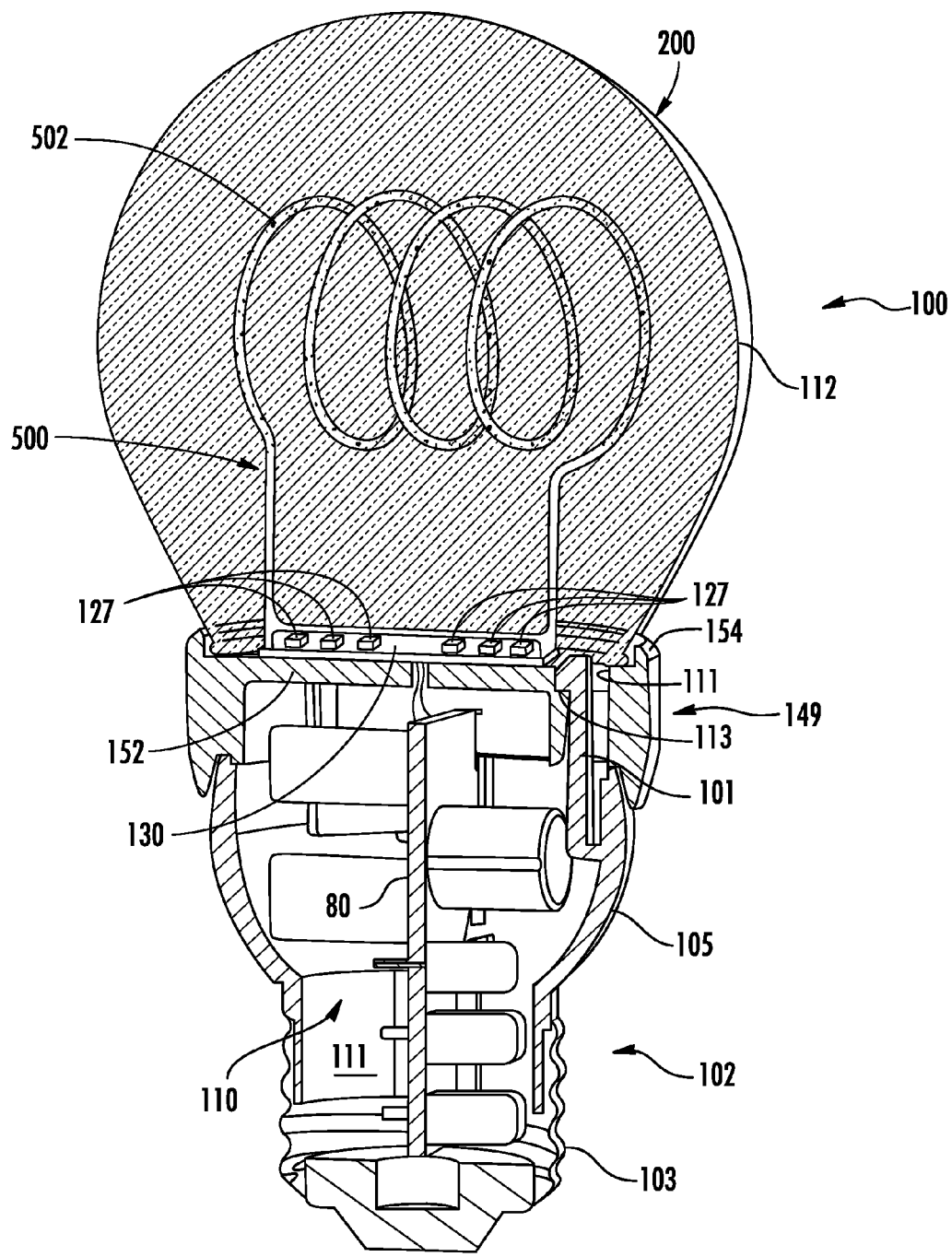
FIG. 9 is a section view of another embodiment of a LED lamp of the invention.
Figure 10:
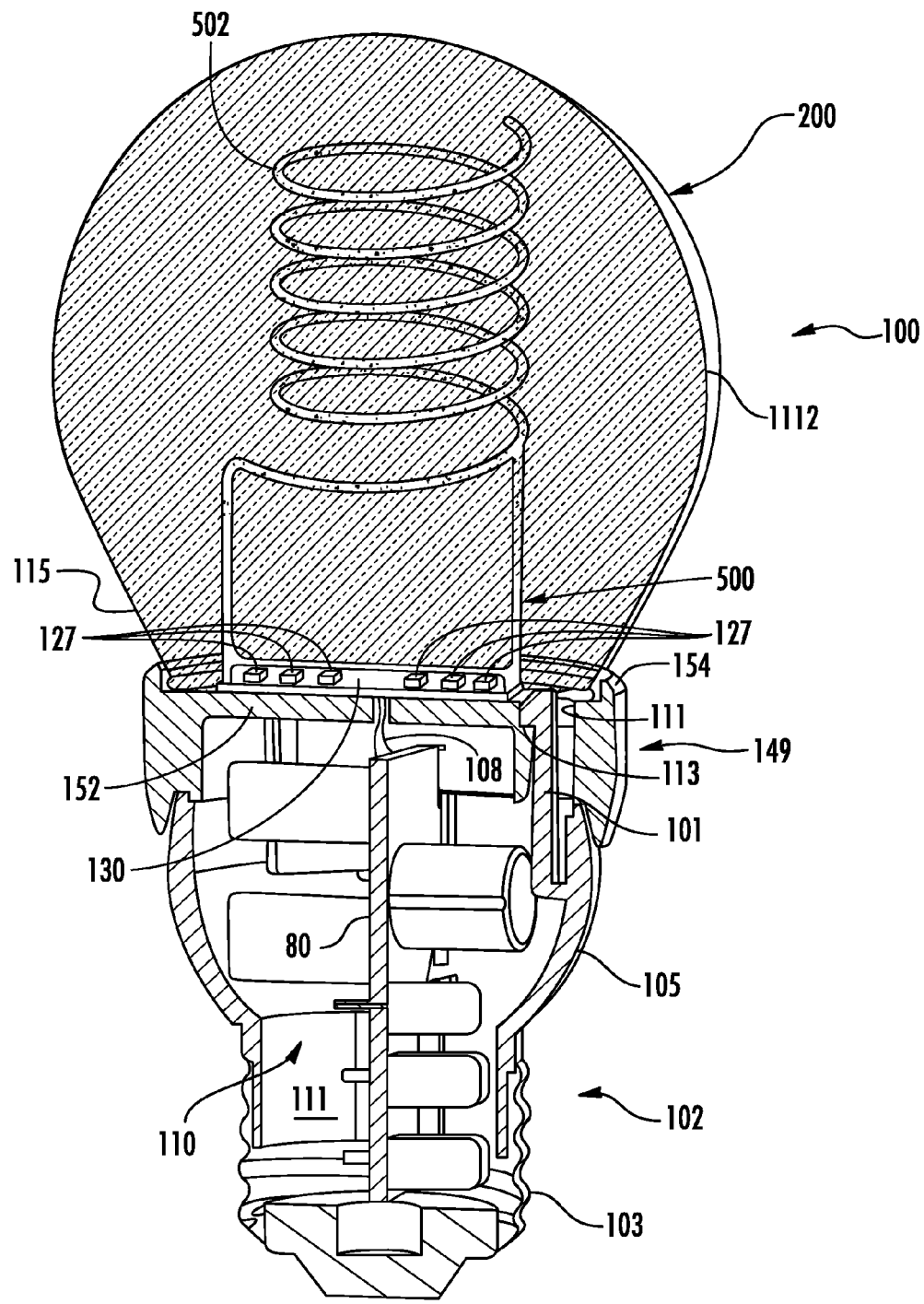
FIG. 10 is a section view of another embodiment of a LED lighting system of the invention.

Other embodiments of a lighting system of the invention are illustrated in FIGS. 8-10. In these embodiments the optic element 200 is created by forming passages in a solid enclosure to create the light guides for transmitting and emitting light in the desired pattern. The optic element 200 is made of an optically transmissive material such as plastic, for example, acrylic, glass or the like. In some embodiments the material may be clear or transparent. In other embodiments the material may comprise transparent colored material such as tinted glass or tinted plastic. The light guide 500 is created by forming a passage or a plurality of passages 502 such as by 3D laser etching where the passages are configured to simulate the illuminated filament such as found in a traditional incandescent bulb such that the light guide 500 has the visual appearance of a glowing filament found in a traditional incandescent bulb. The optic element 200 is formed to have the external dimensions and shape of a lamp enclosure such that the optic element 200 forms both the light guide 500 for the visible light and the external enclosure of the lamp. In such an embodiment the separate enclosure 112 is eliminated such that the exterior surface 1112 of the optic element 200 defines the optically transmissive enclosure and is the exit surface for light emitted from the lamp (in a lamp that uses a separate enclosure 112 the exterior surface of the enclosure 112 is the exit surface for light emitted from the lamp). The passages 502 in the optic element 200 create the light guide 500 for the light emitted by the LEDs 127. The light guide may be formed to have any suitable shape. FIG. 8 shows the optic element with a light guide 500 formed to simulate a cage style filament. FIG. 9 shows the optic element 200 with a light guide 500 formed to simulate a multiple coil style filament. FIG. 10 shows the optic element 200 formed with a light guide 500 to simulate a spiral style filament. The passages formed in the optic element may be formed into other traditional shapes, such as "hairpin", or non-traditional shapes. The internal surface of the passages 502 that form the light guide 500 may be formed with the surface treatment as previously described to define the light emitting portions and the light non-emitting portions of the light guide.

In some embodiments an antenna 600 may be provided in the lamp (FIG. 4) for receiving, and/or transmitting, a radio signal or other wireless signal between the lamp and a control system and/or between lamps. The antenna and related smart technologies may be used in any embodiments of the lamp as described herein. The antenna 600 may convert the radio wave to an electronic signal that may be delivered to the lamp electronics 110 for controlling operation of the lamp. The antenna may also be used to transmit a signal from the lamp. The antenna 600 may be positioned inside of the enclosure 112 such that the base 102 including Edison screw 103 do not interfere with signals received by or emitted from antenna 600. While the antenna is shown in the enclosure 112, the antenna may be located in the enclosure 112 and/or base 102. The antenna may also extend entirely or partially outside of the lamp. In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety.

In some embodiments color control is used and RF control circuitry for controlling color may also be used in some embodiments. The lamp electronics may include light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. which is incorporated by reference herein in its entirety.

Figure 11:
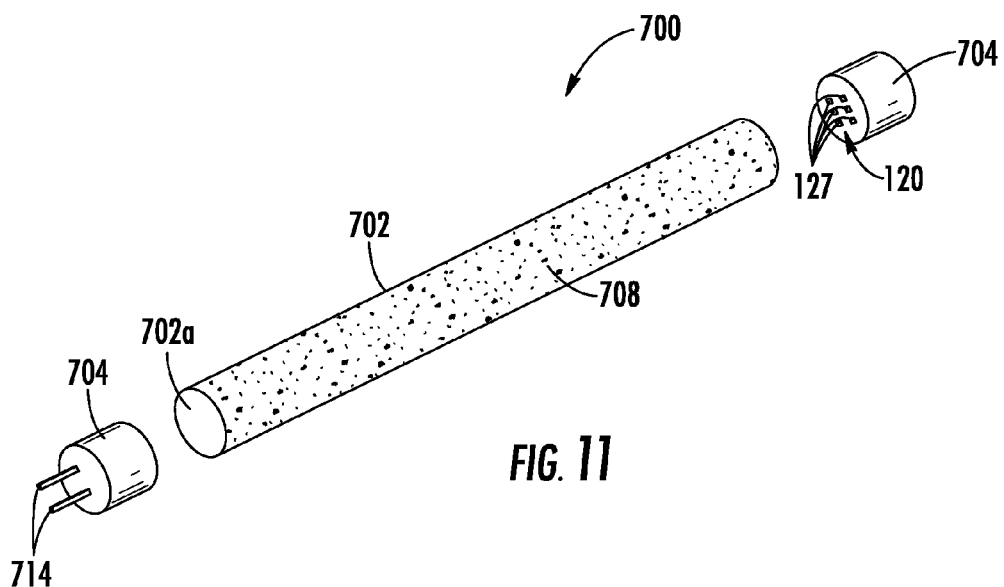
FIG. 11 is an exploded view of another embodiment of a LED lamp of the invention.
Figure 12:
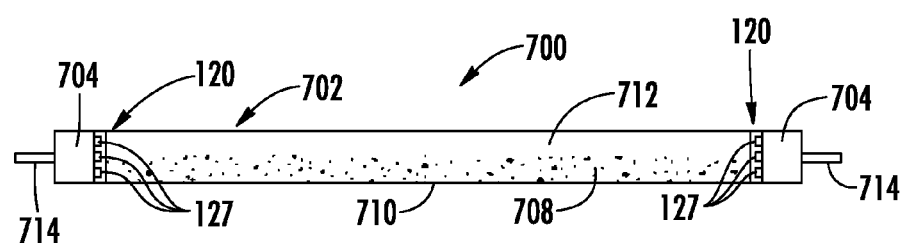
FIG. 12 is a side view of another embodiment of a LED lamp similar to the lamp of FIG. 11.

Another embodiment of the invention is shown in FIG. 11 and comprises an LED lamp 700 that is configured to look like a traditional fluorescent bulb. In the embodiment of FIG. 11 a light guide 702 is provided made of a light transmissive material such as plastic, such as acrylic, glass or other optically transmissive material. The light guide 702 may be formed as a solid piece of light transmissive material having a cylindrical shape to conform to the shape of a fluorescent tube such that the light guide when illuminated mimics the appearance of a traditional fluorescent tube. An LED light source 120 may be provided at each end of the light guide 702 where the ends 702a of the light guide 702 are the light entry surfaces to the light guide 702. The light sources 120 may comprise one or more LEDs and/or LED packages 127 arranged to direct light primarily into the light guide. In some embodiments the light source 120 may comprise LEDs and/or LED packages arranged at only one end of the light guide. The LEDs 127 are connected to a suitable power supply, drivers and heat sink if necessary. The power supply, drivers and/or heat sink may form part of the lamp and may be located in end caps 704 that are secured to the opposite ends of the light guide or they may be components separate from the lamp arranged in a light fixture, junction box or the like or combinations of such arrangements. The light guide 702 is provided with surface treatment 708 as previously described to create light emitting portions where light generated by the LEDs exits the lamp from the light emitting portions. In one embodiment the light emitting portions may comprise all, or substantially all, of the cylindrical surface of the light guide 702 such that light is emitted from the lamp over the entire cylindrical surface of the light guide in a manner similar to the light pattern emitted from a traditional fluorescent tube. In other embodiments, such as shown in FIG. 12, only a first portion 710 of the cylindrical surface of the light guide 702 may be formed as a light emitting portion. A second portion 712 of the light guide may not include the surface treatment such that the second portion is a light non-emitting portion of the lamp. As a result light is emitted from the light guide 702 in a directional pattern. A pair of pins 714 may be provided at either end of the lamp to connect the lamp to the tombstone connectors of a traditional fluorescent fixture. The pins 714 may be mounted on the end caps 704 and may only provide physical support for the lamp with the electrical path to the LEDs being provided over a separate path. However, in some embodiments the pins 714 may be electrically coupled to the LED assembly and form part of the electrical path to the LEDs 127 for providing critical current to the LEDs. In some embodiments power may be provided to the LEDs using conductors other than the pins and tombstone connectors. For example the lamp may be hard wired to a power supply. The lamp 700 may be dimensioned to fit into existing fluorescent light fixtures and may have the same dimensions as traditional fluorescent tubes. The light guide 702 may be provided with the same or similar dimensions as the glass tube of a traditional fluorescent bulb. For example the light guide 702 may be a solid cylinder having an external dimension of one inch and a length of approximately 4 feet such that the lamp may fit into a standard fixture for a four foot fluorescent bulb. In the lamps of FIGS. 11 and 12 the light guide 702 is significantly larger than the light guides described with reference to FIGS. 1-10 where the light guide 200 is intended to fit into the form factor of a standard incandescent bulb. With the linear light as described herein and shown in FIGS. 11 and 12, the light guide 702 and lamp may have any suitable dimensions and may be sized to fit into other standard size fluorescent fixtures or may be sized to fit non-standard applications or fixtures.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. An LED lighting system comprising;
an enclosure;
a base connected to the enclosure;
an LED assembly for emitting light when energized through an electrical path from the base;
an optic element in the enclosure for receiving the light emitted by the LED assembly, the optic element comprising a first portion for transmitting light from the LED assembly to a light emitting portion without emitting visible light where the light emitting portion is located remote from the LED assembly and emits visible light from the optic element, the light emitting portion being configured to visually appear like a filament in a traditional bulb.

2. The LED lighting system of claim 1 wherein the base comprises an Edison base.

3. The LED lighting system of claim 1 wherein the light emitting portion comprises surface treatment on the optic element.

4. The LED lighting system of claim 3 wherein the surface treatment comprises surface indentations formed on the optic element.

5. The LED lighting system of claim 1 wherein the light emitting portion is configured to visually appear like one of a cage, a coil, a loop, and an inverted U filament.

6. The LED lighting system of claim 1 wherein the optic element is transparent.

7. The LED lighting system of claim 1 wherein the light emitting potion comprises a light diffusive surface.

8. The LED lighting system of claim 1 further comprising a switch for lowering current delivered to the LED assembly, the color of the light changing to red/orange/red-orange in response to the lowering of the current.

9. An LED lighting system comprising;
a base;
an LED assembly for emitting light when energized through an electrical path from the base;
an optic element connected to the base for receiving the light emitted by the LED assembly, the optic element comprising an exterior surface and an internal passage defining an internal non-light guide transmitting light from the LED assembly to a light emitting portion where the internal light guide is configured like a filament in a traditional bulb, the exterior surface of the optic element being exposed wherein the exterior surface of the optic element is configured like a traditional bulb.

10. The LED lighting system of claim 9 wherein the exterior surface of the optic element forms the light exit surface of the lamp.

11. The LED lighting system of claim 9 wherein the light emitting portion comprises a surface treatment formed in the internal passage.

12. An LED lighting system comprising;
an enclosure;
a base connected to the enclosure;
an LED assembly for emitting light when energized through an electrical path from the base;
an optic element in the enclosure for receiving the light emitted by the LED assembly, the optic element comprising a first portion for transmitting light from the LED assembly to a light emitting portion where the light emitting portion is located remote from the LED assembly and comprises a surface treatment that diffuses and emits light from the optic element in the light emitting portion, the light emitting portion being configured to visually appear like a filament in a traditional bulb.

* * * * *